Feb. 27, 1934.　　　C. S. ASH　　　1,948,836
PROCESS OF MAKING VINEGAR
Filed Nov. 19, 1932
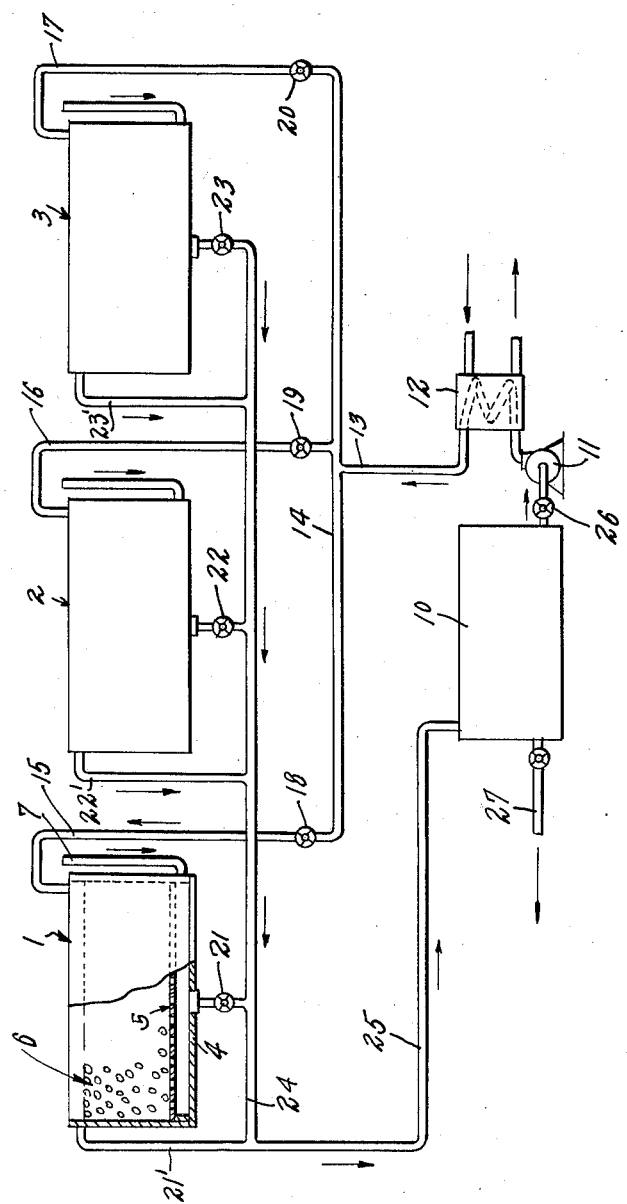
Charles S. Ash　Inventor
By Lyon & Lyon　Attorneys Patented Feb. 27, 1934

1,948,836

UNITED STATES PATENT OFFICE 1,948,836

PROCESS OF MAKING VINEGAR

Charles S. Ash, San Francisco, Calif., assignor to California Packing Corporation, San Francisco, Calif., a corporation of New York Application November 19, 1932
Serial No. 643,389

5 Claims. (Cl. 99—17)

This invention relates to an improved process of fermenting and oxidizing alcohol into dilute acetic acid or vinegar, whereby the yield of vinegar is materially increased. In the process of this invention, evaporation of alcohol from the generators during the conversion process is so greatly reduced as to be of no commercial importance, the danger of over-oxidation (resulting in the formation of carbon dioxide and water) is eliminated and under-oxidation (giving rise to aldehydes) is substantially prevented.

Acidic fermentation of alcoholic liquors for the production of dilute acetic acid or vinegar is an art of great antiquity but the processes used heretofore have not been technically nor economically satisfactory in view of the fact that a great deal of time was required for the conversion and a very appreciable proportion of the alcohol supplied to the vinegar generators was either partly oxidized into aldehydes or the acetic acid formed was converted back into water and carbon dioxide.

The common prior method of making vinegar, termed the "Schutzenbacher" method, consisted in the pratically continuous pouring of a wash solution containing alcohol over the generator bed. As this solution passed downwardly over the packing material, conversion of the alcohol into acetic acid took place. The volume and rate of feed of alcoholic solution had to be very carefully controlled because if the volume fed was too large, the generator could not convert all of the alcohol and a loss of alcohol ensued. When the volume of solution fed was too small, the generator was not running to capacity and an economical loss resulted. The cost and labor of controlling the operation was excessive. Moreover, large losses of alcohol were experienced for other reasons. The generators were taller than deep or wide, generally having a height of two or three times their diameter, and a strong current of air passed through them, carrying with it considerable quantities of alcohol. This caused over-oxidation of both alcohol and acetic acid and the production of ethyl aldehyde, carbon dioxide and water. The central portions of Schutzenbacher's generators being far removed from radiating surfaces and subject to excessive oxidation due to currents of air, would rise to high temperatures and thereby volatilize more alcohol.

The present invention obviates the disadvantages of the prior art and permits the conversion of 90% to 96% of the alcohol instead of the 60% to 80% conversion of the prior methods. Furthermore, the method is extremely simple and does not require the delicate control necessary heretofore. Instead of attempting to continuously convert a flowing stream and produce a flowing stream of vinegar (or solution high in acetic acid), this invention contemplates the gradual increase of acetic acid content of a body of alcoholic solution with a simultaneous and gradual decrease in alcohol content until a finished solution, containing a desired minimum proportion of alcohol, is obtained. Instead of attempting to ferment a continuously flowing stream of alcohol (or solution weak in acetic acid), the present process contemplates the formation of vinegar by a plurality of intermittent fermentation steps.

It has been discovered that by forming a relatively shallow porous bacterial bed of substantially insoluble packing material, such bed preferably having a ratio of horizontal area to height of between 20 to 1 and about 75 to 1 or even more, and then periodically displacing the air within the voids of such bed with a body of alcoholic solution, the entire alcoholic content of the solution is converted into acetic acid, resulting in extraordinary high yields of vinegar of very satisfactory aroma, flavor and acetic acid content.

The periodic floodings of the bacterial bed are so conducted as to leave a film of alcoholic solution on the surfaces of the bed and this film is permitted to ferment and be converted into an acetic acid solution which is subsequently removed and supplanted by solution higher in alcohol by reason of a subsequent flooding and draining operation.

It is an object of this invention, therefore, to disclose and provide an improved process of generating vinegar from alcoholic solutions.

Another object of the invention is to disclose and provide a simple and effective method of converting alcoholic solutions into vinegar, such conversion being accomplished within a relatively short period of time and without the loss of either alcohol or acetic acid.

These and other objects and advantages of this invention will become apparent to those skilled in the art from the following detailed description of a preferred manner of carrying out the process.

In describing the invention, reference will be had to the appended drawing which diagrammatically illustrates an arrangement of generating units in which the fermentation or oxidation of the alcoholic liquor into vinegar may take place.

Generally stated, the method of this invention comprises the formation of a relatively shallow and porous bed of packing material, inoculation of the bed with vinegar ferments, the displacement of all the air from the bed by filling the voids in the bed with an alcoholic solution, the drainage of the solution from the bottom of the bed so as to suck air into the voids thereof, conversion of films of alcoholic solution on the surfaces of the bed, and a repetition of such displacement with the same alcoholic solution at intervals of time until the alcoholic content of the solution drops to about 1/20 of 1% (or other desired minimum), the remainder of the alcohol having been converted during these operations into vinegar.

One of the essential steps of the process comprises the formation of a bacterial bed of packing material. The packing material may consist of any porous substance insoluble in alcoholic or acetic acid solution. Various materials such as pumice, wood shavings, corn-cobs, bundles of twigs or bamboo, earthenware, etc., may be used. Preferably the bed itself is relatively shallow, the ratio of diameter to height being 5 or more to 1. In other words, the height of the bed is preferably ⅕ the diameter. When rectangular or square beds are employed, substantially the same ratio of depth to height should be maintained, although the horizontal area to height may be greater. As stated hereinbefore, the ratio of the horizontal area to the height of the bed preferably exceeds about 20 to 1. For economic reasons the height of the bed preferably does not exceed about 8 feet. It is to be understood, however, that although a porous bed coming within these ratios of height to diameter or area has been found to give best results as far as high yields of vinegar are concerned, the method of operation embraced by this invention is applicable to any and all shapes or sizes of generator beds.

As shown on the attached drawing, the method may be carried out most effectively when a plurality of generators are used. For purposes of illustration, three cylindrical generators 1, 2 and 3 are shown. The generators may be provided with a bottom 4 and false bottoms 5 spaced therefrom. These false bottoms 5 are foraminous or ported so as to merely provide an open grille work or support for a bed of insoluble material, indicated at 6. The generators are provided with one or more air inlet pipes 7 extending upwardly from between the space separating the true and false bottoms.

In actual operation, after a bacterial bed has been formed in each of the generators, a body of alcoholic solution from a storage tank 10 is pumped as by means of pump 11 through a heat exchanger or cooler 12 and discharged by line 13 into a header 14 provided with branch outlet lines 15, 16 and 17 leading to generators 1, 2 and 3 respective. The branch lines 15, 16 and 17 are preferably provided with valves 18, 19 and 20.

The generators 1, 2 and 3 are provided with valved discharge lines 21, 22 and 23 leading to a discharge manifold line 24 which communicates with a return line 25 leading back to the storage tank 10. In addition, the upper portion of each of the generators is provided with an overflow line such as the line 21', 22' and 23' also communicating with the return line 25.

Assuming that the bed 6 has been properly inoculated with vinegar-producing bacteria or ferments and it is desired to place the generator 1 in operation, valves 21, 19 and 20 are closed and valve 18 is open. Alcohol solution from the storage tank 10 is sent through lines 13, 14 and 15 into the generator 1 so as to completely fill and saturate the entire generator and bed. The alcoholic solution may be distributed over the surface of the bed in any suitable manner so as to prevent channeling of the bed. Excess alcoholic solution may be permitted to run out through the overflow line 21' into discharge line 25 and back into the storage tank 10. A volume of alcoholic solution in excess of that required to merely fill the voids existing in the bed 6 is used.

After the generator has been flooded in the manner stated, the supply of alcoholic solution to line 15 is discontinued by closing valve 18 and possibly outlet valve 26. Valve 21 is then opened and excess alcoholic solution permitted to drain from the bed back into the storage tank 10. A film of solution high in alcohol is thus left on the surfaces of the particles constituting the bacterial bed 6 and a relatively rapid and complete conversion or fermentation of this residual film may now take place in the generator bed. During fermentation of generator 1, generators 2 and 3 may be flooded in the manner described.

After permitting fermantation or conversion to take place in generator 1 for a period of from 12 to 36 hours and preferably for a period of about 24 hours, the flooding operation is repeated, a sufficient volume of alcoholic solution from the storage tank 10 being passed through the bacterial bed 6 so as to completely remove therefrom the previously fermented films from the surfaces of the particles constituting the bed. The flooding or washing and flooding operation is then followed by a draining operation and the generator again left alone for a period of from 12 to 36 hours for another fermenting period.

In this manner the alcohol content of the solution in storage tank 10 is gradually reduced whereas the acetic acid content of the solution is gradually increased. The sequence of fermenting, washing, flooding and draining operations is periodically repeated until the alcohol content of the solution in the storage tank 10 drops to a desired minimum whereupon the resulting acetic acid solution or vinegar may be withdrawn from the storage tank by discharge line 27 and bottled or otherwise disposed of.

During the process of making vinegar, the wash may be heated or cooled in the heat exchanger 12. The temperature of the wash and of the generator beds is preferably kept between 80° F. and 95° F. The temperature of the beds may thus be raised or lowered by changing the temperature of the alcoholic wash supplied thereto during the flooding operations.

Although the drawing indicates an arrangement of elements whereby the alcoholic wash is supplied to the top portions of the generator, it is to be understood that any method of supplying the generators with wash, whether from the top, bottom, through sprinkler arrangements, or the like, may be used. As a matter of fact, it has been found efficacious to flood the generators with fresh alcoholic wash from the bottom about once a week so as to reconsolidate the bed and eliminate any channels which may have formed during the preceding weekly period of washing from the top.

It is to be understood that during the removal of previously fermented films from the bed and during the washing and draining operations to which the beds are subjected periodically, a volume of alcoholic solution in excess of the volume of the interstitial spaces in the bed is employed. For example, a vinegar generator having bed space and capacity when empty of 1,000 gallons may be filled with a packing which takes up 50% of the bed space. A generator bed of this type will retain 300 to 400 gallons of solution on the surfaces of the packing for intensive conversion during the fermentation period. During the removal of this fermented film, it is desirable to use in excess of 500 gallons of alcoholic solution and actually about 1,000 gallons are used in the practice of this invention or twice as much as would be necessary to fill the interstitial spaces in the packing.

It may be observed that during the draining period of a bed, air is sucked into the voids of the packing, replacing the fumes of alcohol and acetic acid, etc. A fresh supply of air is thus drawn into the interstices of the packing and is available for the oxidation of the alcohol into acetic acid. Small additional volumes of air enter the packing during the conversion period, such air being drawn into the bed through the air inlet lines 7. The volume of air so drawn in, however, is relatively small and no intensive draft of air exists through the bed. The absence of air currents through the bed during the fermentation period is particularly noticeable when the beds or generators are of the ratios of height to area or height to diameter referred to hereinabove.

Although a specific apparatus has been described in detail hereinabove, it is to be understood that it is merely illustrative and all changes and modifications as come within the scope of the appended claims are embraced thereby.

I claim:

1. A method of converting alcoholic solutions into acetic acid solutions by a plurality of intermittent fermenting steps, which comprises forming a porous bed of substantially insoluble material, inoculating the bed with vinegar ferments, forming a film of alcoholic solution upon the surfaces of said bed, fermenting said alcoholic solution retained on the surfaces of said bed to increase the acetic acid content thereof, passing an excess of alcoholic solution from storage through said bed to remove previously fermented solution, draining alcoholic solution from said bed into storage so as to leave a film of alcoholic solution on the surfaces of said bed, and repeating said fermenting, washing and draining operations until the alcohol content of the solution passing to storage drops to a desired minimum.

2. In a method of converting alcoholic solutions into acetic acid solutions by a plurality of intermittent fermenting steps, the steps of fermenting an alcoholic solution retained on the surfaces of a porous bacterial bed for a period of 12 to 36 hours to increase the acetic acid content thereof, then washing the bed with alcoholic solution from storage to wash away the fermented solution and to replace the same with alcoholic solution, draining excess alcoholic wash from the bed into storage so as to leave a film of alcoholic solution on the surfaces of the bed, and repeating said fermenting, washing and draining steps until the alcohol content of the solution in storage drops to a desired minimum.

3. In a method of converting alcoholic solutions into acetic acid solutions by a plurality of intermittent fermenting steps, the steps of fermenting an alcoholic solution retained on the surfaces of a porous bacterial bed for a period of 12 to 36 hours to increase the acetic acid content thereof, then washing the bed with alcoholic solution from storage to wash away the fermented solution and to replace the same with alcoholic solution, regulating the temperature of said bacterial bed by changing the temperature of the alcoholic solution prior to washing said bed therewith, draining excess alcoholic wash from the bed into storage so as to leave a film of alcoholic solution on the surfaces of the bed, and repeating said fermenting, washing and draining steps until the alcohol content of the solution in storage drops to a desired minimum.

4. In a method of converting alcoholic solutions by a plurality of intermittent fermenting steps into vinegar, the steps of fermenting an alcoholic solution retained on the surfaces of a porous bacterial bed, substantially removing the fermented solution from said surfaces and replacing said removed solution with an alcoholic solution, permitting said replaced alcoholic solution to ferment on said surfaces, and repeatedly removing, replacing and fermenting said solution in cyclic operation of the process until the alcoholic content thereof is reduced to a desired minimum.

5. A method of converting alcoholic solutions by a plurality of intermittent fermenting steps into vinegar, which comprises forming a porous bed of substantially insoluble material, said bed not exceeding eight feet in height and having a ratio of horizontal area to height of more than about 20 to 1, inoculating the bed with vinegar ferments, forming a film of alcoholic solution from storage upon the surfaces of said bed, fermenting said alcoholic solution retained on the surfaces of said bed for a period of from 12 to 36 hours so as to increase the acetic acid content thereof, passing an excess of alcoholic solution from storage through said bed to remove previously fermented solution, draining alcoholic solution from said bed into storage so as to leave a film of alcoholic solution on the surfaces of said bed, and repeating said fermenting, washing and draining operations in sequence until the alcohol content of the solution passing to storage drops to a desired minimum.

CHARLES S. ASH.